United States Patent
Ng

(10) Patent No.: US 7,261,454 B2
(45) Date of Patent: Aug. 28, 2007

(54) SYSTEM AND METHOD FOR FORMING A BACK-LIGHTED ARRAY USING AN OMNI-DIRECTIONAL LIGHT SOURCE

(75) Inventor: Kee Yean Ng, Penang (MY)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 20 days.

(21) Appl. No.: 11/234,509

(22) Filed: Sep. 23, 2005

(65) Prior Publication Data

US 2007/0070614 A1    Mar. 29, 2007

(51) Int. Cl.
*F21Y 101/02* (2006.01)

(52) U.S. Cl. .................. 362/555; 362/561; 362/240; 362/241; 257/98

(58) Field of Classification Search ............... 362/611, 362/612, 613, 555, 561, 31, 237, 240, 241, 362/249; 439/65; 438/27, 28, 29, 26; 445/25; 257/98–100

See application file for complete search history.

(56) References Cited

U.S. PATENT DOCUMENTS

| 2002/0097578 A1* | 7/2002 | Greiner | 362/240 |
| 2004/0046222 A1* | 3/2004 | Nagai et al. | 257/433 |

\* cited by examiner

*Primary Examiner*—Laura Tso

(57) ABSTRACT

An omni-directional LED device is constructed such that light is prevented from exiting from the top of the LED device. In one embodiment, an opaque barrier is created and in some embodiments enhancement surfaces are created below the opaque barrier to increase lumen output from the device sides. In one embodiment, a reflecting structure is created to assist with horizontal light mixing. The horizontally mixed light is then redirected through a structure, such as an LED structure, to create a high lumen output, slender back-lighted display.

20 Claims, 5 Drawing Sheets

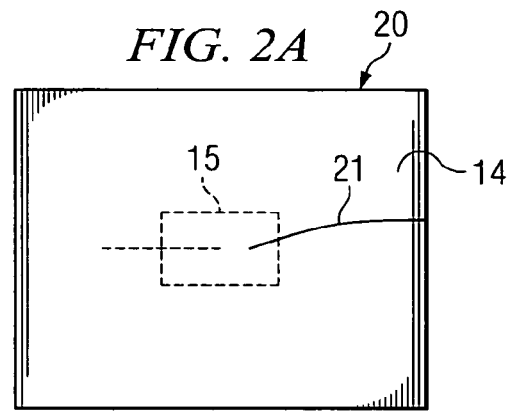
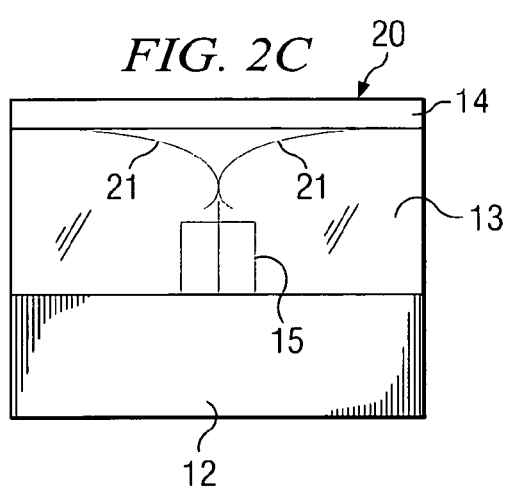
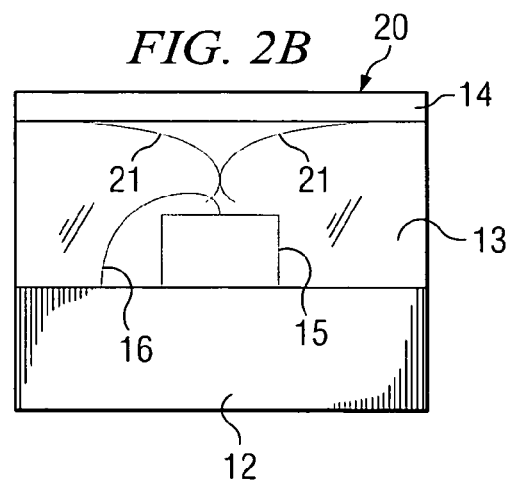

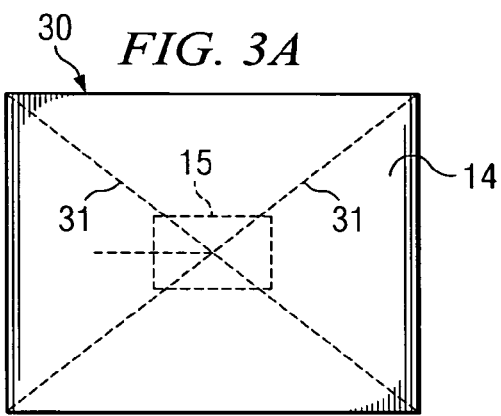
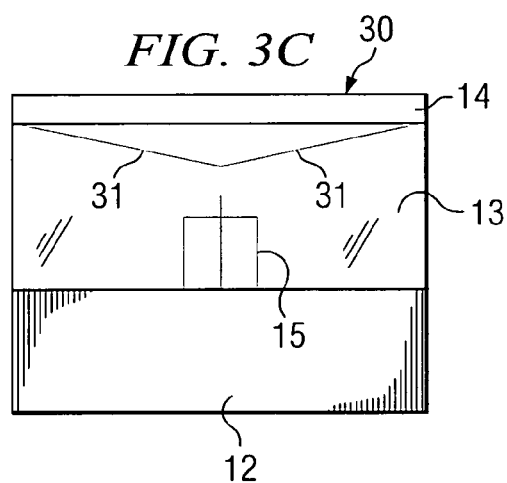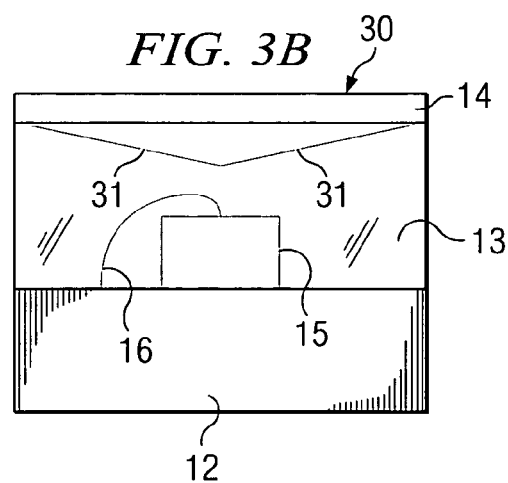
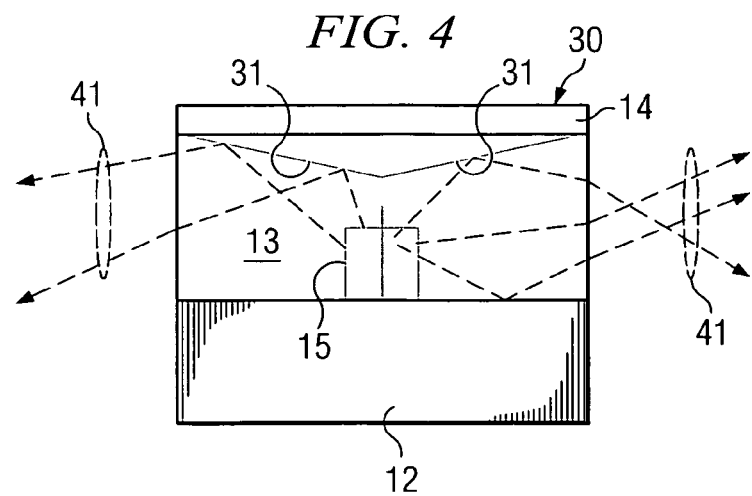

SYSTEM AND METHOD FOR FORMING A BACK-LIGHTED ARRAY USING AN OMNI-DIRECTIONAL LIGHT SOURCE

TECHNICAL FIELD

This invention relates to light emitting devices and more particularly to omni-directional light emitting diodes (LEDs) used to form a back-lighted array.

BACKGROUND OF THE INVENTION

Back-lighted display devices have become popular for a variety of display purposes. Some of these displays are large and some small. The actual light for such devices is provided, as the name implies, from behind (the side away from a viewer). Light emitting diodes (LEDs) are now increasingly being used to provide the light source in such back-lighted applications.

An example of an LED lighted application is a liquid crystal display (LCD) where a number of LEDs are spatially distributed behind the LCD so that their light transmits through the LCD. The light from each LED is filtered by the LCD to provide red, green and blue pixels.

LED devices are directional light sources where the light is typically directed towards the central axial direction of the LED. A common problem in using LEDs as back-lights is that the resultant LCD display does not display uniform luminance, i.e., the display surface brightness is not uniform. The region directly above the LED device typically is brighter than the rest. These "hot spots" do not have a pleasant look.

Another common problem is that the light coming from the LED devices are poorly mixed. In a back-lighted display, red, green and blue LED devices are typically used and the different colors must be uniformly mixed to ensure a uniform color, for example, white color, is obtained. If color mixing from the LCDs is poor, then different portions of the LCD show different colors.

One prior solution to prevent hot spots is to place a diffusing film above the back-lighted array. This solution helps minimize, but does not eliminate the problem. The diffusing film attenuates the amount of light transmitted through the LCD and thus the overall brightness of the back-light module drops.

A prior solution to ensure more uniform color mixing is to increase the distance between the LED devices and the LCD display so that a larger light mixing zone is created. This increases the chance of light mixing before reaching the LCD at the expense of increased device thickness.

BRIEF SUMMARY OF THE INVENTION

An omni-directional LED device is constructed such that light is prevented from exiting from the top of the LED device. In one embodiment, an opaque barrier is created and in some embodiments enhancement surfaces are created below the opaque barrier to increase lumen output from the device sides.

In one embodiment, a reflecting structure is created to assist with horizontal light mixing. The horizontally mixed light is then redirected through a structure, such as an LCD structure, to create a high lumen output, slender back-lighted display.

BRIEF DESCRIPTION OF THE DRAWINGS

For a more complete understanding of the present invention, reference is now made to the following descriptions taken in conjunction with the accompanying drawings, in which:

FIGS. 1A, 1B, 1C, 2A, 2B, 2C, 3A, 3B, and 3C illustrate one embodiment of the construction of an omni-directional LED;

FIG. 4 illustrates one embodiment of light being emitted out of the sides of the device;

DETAILED DESCRIPTION OF THE INVENTION

Prior to beginning the detailed description it would be helpful to review prior art LED devices used for back-lighting purposes.

Figure 7:
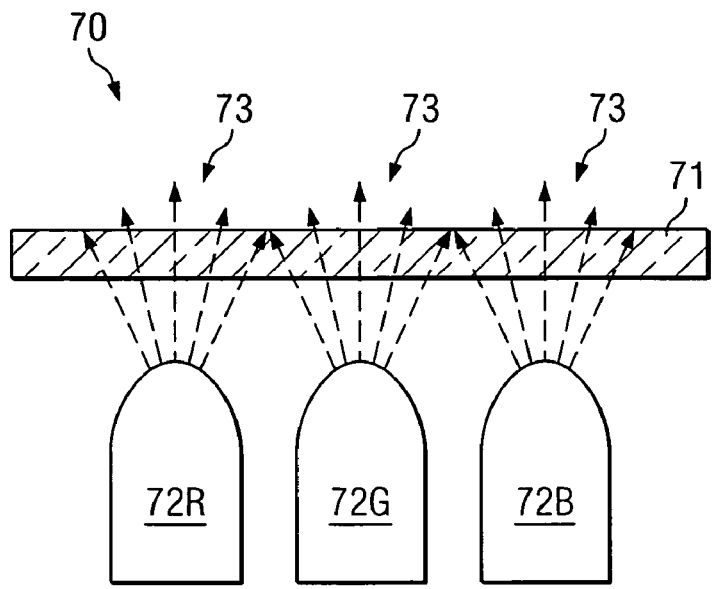
FIGS. 7 and 8 illustrate prior art back-lighted displays.

FIG. 7 shows device 70 having three LEDs (72R, 72G and 72B) with light coming from their respective tops and passing through liquid crystal display (LCD) 71 forming hot spots 73. These hot spots are due primarily to poor color mixing between the LEDs.

Figure 8:
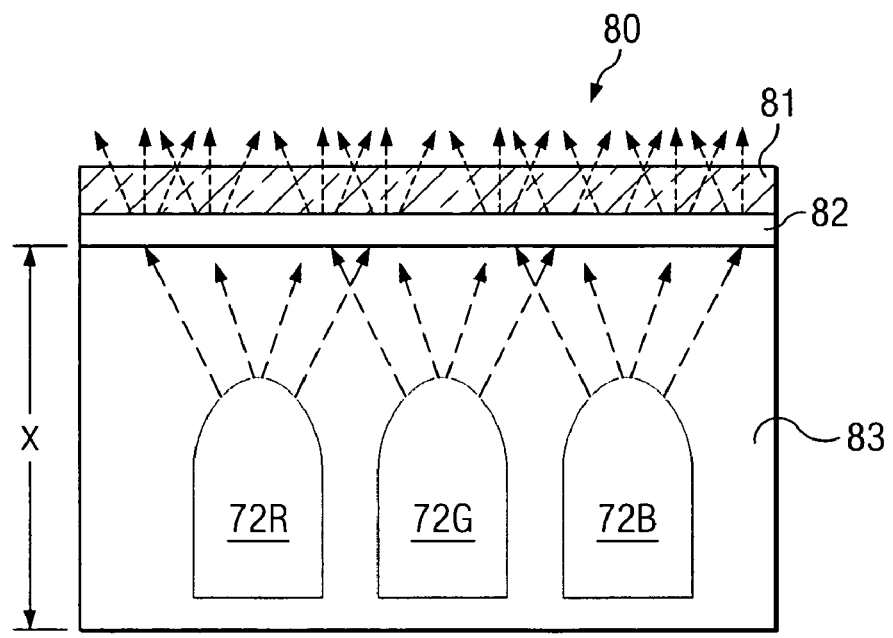

FIG. 8 shows the addition of diffusing film 82 to back-lighted device 80. Device 80 has light mixing area 83 with a depth X. Note that the larger the value for X the more the light from the three LEDs (72R, 72G and 72B) will mix. However, as X increases so does the dimensional profile of the device. This makes the device bulky and decreases the light passing through LCD 81. The decreased light caused by the increased depth, coupled with the light decrease caused by diffusing film 82, leaves room for improvement.

Figure 1A:
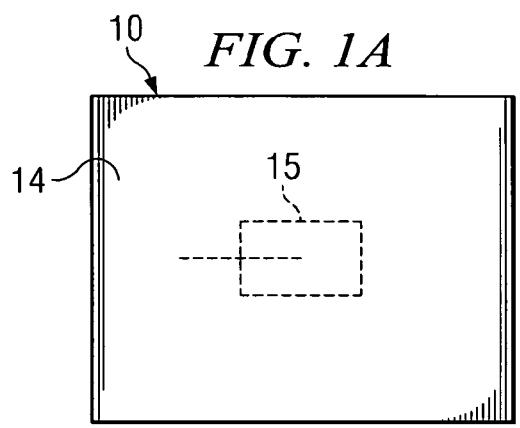
Figure 1B:
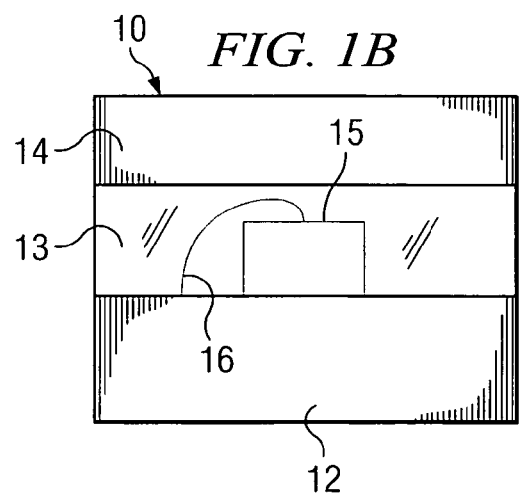
Figure 1C:
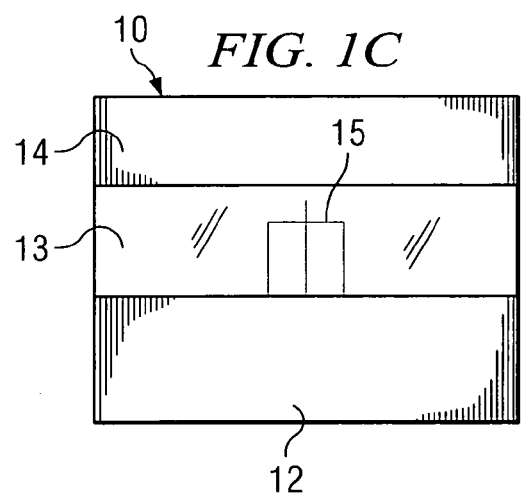

FIGS. 1A, 1B and 1C illustrate one embodiment 10 of an LED device fabricated such that light is emitted omni-directionally, i.e., from all four sides, but not from the top 10. FIG. 1A shows the plan view, FIG. 1B shows the front view and FIG. 1C shows the side view of device 10. Since no, or very little, light is emitted from the top of the LED, hot-spots are eliminated as will be seen. FIGS. 1A, 1B, and 1C show top, front and side views of LED device 10 having substrate 12. Device 10 has LED 15 with wire 16. Area 13 is a clear encapsulate and area 14 is an opaque encapsulate. Note that while a device is shown having square sides, the device could be round or could have any number of sides surrounding the LED.

LED chip 15 has a pair of terminals (not shown) with the LED chip attached to a first terminal via wire 16. A second electrical connection is made between the LED chip and a second terminal. The clear encapsulate has a low light attenuation characteristic. Second layer opaque encapsulate 14 covers the first layer on the top side. The second layer has a high light attenuation characteristic and does not cover the vertical sides of the optically transparent layer. As will be seen, this allows light emits from the LED device from all sides except for the top.

FIGS. 2A, 2B, 2C and 3A, 3B, 3C illustrate alternate embodiments. In FIG. 2C interfaces 21 between transparent encapsulate 13 and opaque encapsulate 14 of device 20 are shaped as reflectors so that light is reflected out sideways more efficiently. FIG. 2B shows the front view and FIG. 2A shows the plan view.

In FIG. 3C, reflector 31 of device 30 has a different shape, but performs the same function, i.e., increasing the efficiency of sideways light output. FIG. 3B shows the front view and FIG. 3A shows the plan view.

FIG. 4 illustrates light 41 being reflected out sideways from device 30 (10, 20) in all directions, except for the top (and bottom).

Figures 5, 6:
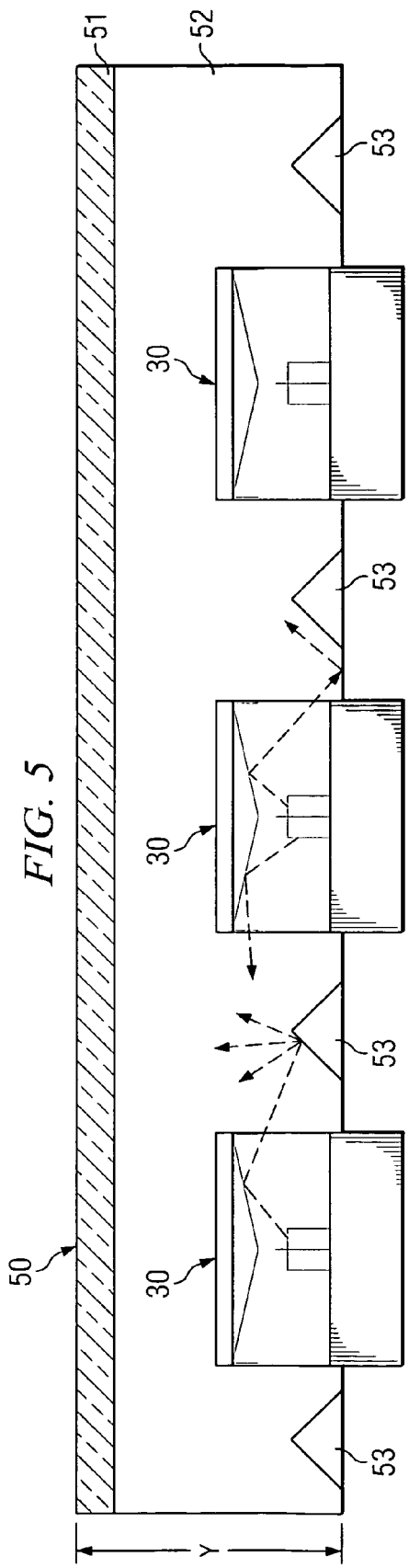
FIG. 5 illustrates one embodiment of a LED device showing how light is mixed.
FIG. 6 illustrates one embodiment of LED devices used to form back-lighting in a display.

Since the light is emitted sideways, mixing of light from each LED device is facilitated in the horizontal direction. FIG. 5 shows LEDs 30 which can be implemented as a back-light using red, blue and green, if desired. LEDs 30 preferably are partially inserted into the light guide so that light emits into the light guide horizontally. In this embodiment, the reflecting features such as feature 53, can be optionally provided so that the mixed light is directed toward LCD 51. Hence, long vertical light-mixing portion (dimension X in FIG. 8) can be reduced yielding a slimmer LCD inner portion 52 thereby allowing the entire device to be thinner. Light mixing region 52 can have a dimension Y that is less than 30 mm thick and can be a light guide or it can be air, if desired. The diffusion layer could, if desired, be eliminated from embodiment 50 thereby increasing the lumen output for a given power level. Note that while FIG. 5 shows the LEDs lined up in a row, they can also be grouped together (for example, red, blue and green would be in groups of three) so that when the light that is mixed evenly from the group impacts the LCD it is essentially white and free of hot spots. Also note that while in the preferred embodiment all (or most) of the light is prevented from exiting the LED by the opaque layer, it could be possible to redirect whatever light comes from the top of the LED (or from the top areas of the sides of the LED) back down to features 53 to allow for mixing and/or scattering of the light prior to the light impacting top surface 51. As is well known, by turning the power on or off to the different colored LEDs within each group, different colors are produced on the outer surface of the top surface.

FIG. 6 shows the top view of display 50 showing LEDs spaced apart beneath LCD 51. In one embodiment, red, green and blue LEDs are arranged spatially so that horizontal light emitted from the LEDs are mixed and appears uniformly white at top surface 51. Note that while FIG. 6 shows LEDs populating fully the surface beneath LCD 51, in an alternate embodiment, the LEDs can be placed near an edge and the light emitted from the LEDs is guided to distal edges. In yet another embodiment, LEDs can be placed around the perimeter and the light emitted from the LEDs guided towards the centre. In such arrangements, it would be helpful to use LEDs that have light coming from less than all four sides. One method for achieving this result would be to fabricate the second layer encapulate such that light is emitted in a preferred side. By adjusting the profile of any reflecting faces of the second layer encapsulate, light may emit from just one side. For example, if the second layer covers three sides (of a four sided device), then light is emitted from just one side.

Substrate 12 is preferably a printed circuit board (PCB) but other substrates such as ceramic, can be used. Circuit traces are fabricated on the surface of the PCB or ceramic substrate so as to form terminals for the placement of the LED and wire bond. Terminals can be formed on both surfaces of the substrate and connected using plated-through via holes. The terminals on the bottom side of the LED device are used for assembly to a mother PCB (not shown) if desired. In an alternate embodiment, a cavity can be fabricated on the substrate for the placement of the LED to enable construction of thinner LED device.

In an alternate embodiment, a plastic insert molded leadframe can be used. Leadframes made of metal are molded so that the terminals are encased in plastic material. In yet another alternate embodiment, a metal-core PCB is used as substrate 12 to facilitate heat dissipation.

The methods of fabrication of PCB (metal core and non-metal core) and ceramic substrates and plastic insert molded leadframe are all known in the art.

In the embodiment shown in FIG. 1, the first layer encapsulate (clear) is any organic polymer, inorganic material or air. In the preferred embodiment, the material is optically clear epoxy. Alternatively, silicone can also be used. In addition, inorganic material, such as glass or aluminum nitride, can be used. The first layer encapsulate can be deposited using any known process, such as transfer molding, insert molding, spraying, casting or capping. In an alternate embodiment, the first layer encapsulate can also optionally be made slightly diffused by adding diffusant.

The second layer encapsulate (opaque) can be constructed of organic or inorganic material. White opaque epoxy is preferred but, polycarbonate, PMMA, PVC, PBT can be used. The second layer encapsulate can be deposited using any known process such as transfer molding, insert molding, spraying, casting or capping. Alternatively, the second layer can be prefabricated as a separated component and then attached onto the substrate using an adhesive or any other known system of attachment.

If desired, a reflective mirror can be deposited on the surface of the first layer encapsulate prior to the placement of the second encapsulate. The mirror would act to further aid light extraction through the sides of the LED device. The reflective mirror can be constructed of metal or semiconductor material deposited using any known process such as sputtering or evaporation.

Although the second layer encapsulate is described as opaque, it should be noted that the opacity can be tuned to be different at different wavelengths of light. This can be achieved by fabricating the second layer encapsulate as a coating, for example, using multiple layers of coatings with varying refractive indices.

An illustrative manufacturing process is as follows: Attaching die, forming a wire bond, placing a first layer low light attenuation encapsulate around an LED chip, and second layer high light attenuation encapsulate on the top surface of the first layer encapsulate.

In an alternate embodiment, the first layer encapsulate can be impregnated with a wavelength converting material such as phosphor particles, nano-phosphors or luminescent dye. The wavelength converting material absorbs a first color light and then reemits a second color light as is well know. For example, by adding yellow phosphor particles in the first encapsulate and using a blue LED as light source, a composite emission of blue and yellow light is obtained.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A device for providing light output, said device comprising:
   a light source;
   a first structure surrounding said light source, said structure having low light attenuation characteristics allowing light to exit said device through the sides of said first structure; and
   a second structure positioned with respect to said first structure, said second structure having high light attenuation characteristics to prevent light from exiting a top surface of said device.

2. The device of claim 1 further comprising:
   reflection enhancement positioned inward of said second structure to facilitate said light to exit through said sides of said device.

3. The device of claim 2 wherein said reflection enhancement comprises:
   a reflective structure positioned at the interface between said first and second structures.

4. The device of claim 1 wherein said light source is a light emitting diode (LED).

5. The device of claim 4 positioned with a plurality of other similar devices within a light mixing region of a back-lighted display, said mixing region having a top surface through which light from a plurality of said device passes, said mixing region comprising structure for allowing light from several of said devices to mix in a horizontal plan prior to impacting said top surface.

6. The device of claim 5 wherein said light mixing structure further operates to scatter said light.

7. The device of claim 5 wherein the medium of said mixing region is selected from the list of: air, light guide.

8. The device of claim 5 wherein said top surface is a liquid crystal display.

9. The device of claim 1 wherein said second structure is of a different material composition from said first structure.

10. The device of claim 1 wherein said first structure has a wavelength converting material.

11. The device of claim 10 wherein said wavelength converting material is phosphor.

12. The device of claim 1 wherein said second structure has a wavelength converting material.

13. The device of claim 12 wherein said wavelength converting material is phosphor.

14. The device of claim 10 wherein said first structure diffuses the light passing therethrough.

15. The device of claim 1 wherein said second structure prevents light from existing from at least one side surface of said device as well as from said top surface.

16. The method of manufacturing an LED, said method comprising:
    mounting an LED die upon a substrate;
    attaching a wire bond to the LED die;
    placing a first layer low light attenuation encapsulate around the LED die;
    placing a second layer high light attenuation encapsulate on a top surface of said first layer; and
    constructing between said first and second layers a reflection enhancing structure to facilitate light exiting the LED.

17. A device for providing light output, said device comprising:
    a light source;
    means surrounding said light source, said surrounding means having low light attenuation characteristics; and
    means positioned with respect to a top surface of said surrounding means, said positioned means having high light attenuation characteristics to prevent light from exiting a top surface of said device.

18. The device of claim 17 further comprising:
    means positioned inward of said positioned means to facilitate said light to exit through sides of said device.

19. The device of claim 18 wherein said inward positioned means is positioned at the interface between said first and second structures.

20. The device of claim 17 wherein said light source is a light emitting diode (LED) chip.

* * * * *